United States Patent [19]
Barker et al.

[11] Patent Number: 5,996,304
[45] Date of Patent: Dec. 7, 1999

[54] COATING COMPOSITION AND METHOD

[75] Inventors: Roger Keith Barker, Walhalla, S.C.;
Richard Henry Butler, Brandon, Fla.

[73] Assignee: Infraliner Systems, Inc., Tampa, Fla.

[21] Appl. No.: 08/850,130

[22] Filed: May 1, 1997

[51] Int. Cl.$^6$ .............................. E04B 1/00; E04G 21/00; E04G 23/00

[52] U.S. Cl. .......................... 52/741.41; 52/515; 52/516; 52/517; 52/309.12; 156/309; 156/71; 156/153; 427/403; 427/208.4

[58] Field of Search ................... 52/DIG. 7, 21, 52/20, 19, 408, 409, 410, 411, 451, 515, 516, 517, 741.41, 309.12; 156/309, 71, 153, 306, 334; 260/2.3, 33.6; 427/403, 208.4, 393.6; 428/451, 521, 538

[56] References Cited

U.S. PATENT DOCUMENTS

| | | | |
|---|---|---|---|
| 2,610,960 | 9/1952 | Norlander | 260/40 |
| 2,632,752 | 3/1953 | Anderson | 260/40 |
| 2,641,586 | 6/1953 | Norlander et al. | 260/40 |
| 2,642,409 | 6/1953 | Cordier | 260/39 |
| 2,981,713 | 4/1961 | Hanson | 260/40 |
| 3,371,712 | 3/1968 | Adams | 166/33 |
| 3,676,198 | 7/1972 | McGroarty | 52/741.4 X |
| 3,713,297 | 1/1973 | Hochbach | 61/36 |
| 3,721,643 | 3/1973 | Vargiu et al. | 260/40 |
| 3,862,083 | 1/1975 | Dixon et al. | 260/40 |
| 4,193,831 | 3/1980 | Fujii et al. | 52/741.4 X |
| 4,204,988 | 5/1980 | Crouzet | 260/29.6 |
| 4,212,790 | 7/1980 | Ibata et al. | 260/40 |
| 4,322,334 | 3/1982 | Arakawa et al. | 523/512 |
| 4,352,897 | 10/1982 | Ogata et al. | 523/220 |
| 4,497,918 | 2/1985 | Wason | 523/220 |
| 5,120,344 | 6/1992 | Libor et al. | 71/27 |
| 5,314,729 | 5/1994 | Ikezoe et al. | 428/15 |
| 5,395,866 | 3/1995 | Ross et al. | 523/512 |
| 5,436,396 | 7/1995 | Bailey et al. | 523/130 |
| 5,476,142 | 12/1995 | Kajita | 166/294 |
| 5,711,834 | 1/1998 | Saito | 52/DIG. 7 X |

OTHER PUBLICATIONS

John A. Redner, et al, "Evaluation of Protective Coatings for Concrete", County Sanitation District of Los Angeles County, Whittier, California, Feb. 1995.

Primary Examiner—Carl D. Friedman
Assistant Examiner—W. Glenn Edwards
Attorney, Agent, or Firm—William D. Lee, Jr.; Cort Flint

[57] ABSTRACT

A blend of bonding polyester with an acid resistant polyester and heat dispersant filler providing a liner especially suitable for concrete structure subjected to acidic environments. The blend can also be used in combination with aggregate or fibers to be extruded or molded into articles which are substitutes for conventional concrete.

7 Claims, 2 Drawing Sheets

COATING COMPOSITION AND METHOD

FIELD OF THE INVENTION

This invention relates to a polymeric composition for forming protective coatings for concrete, masonry, steel and other structural surfaces and for use as a supporting matrix for molded or extruded products which can replace or be substituted for traditional concrete products. In one specific aspect, the invention relates to a method for applying the protective coating to concrete surfaces such as those found in either new or deteriorated manholes and lifting stations which will be or have been exposed to acidic corrosion. In a more general aspect, the invention relates to a polymeric coating system useful in preventing corrosion and leakage in storage and naval vessels and in conducting passageways for chemicals, waste water, sea water, and petroleum products.

BACKGROUND OF THE INVENTION

The protection of construction materials from the corrosive effects of chemicals in the environment has always received a great deal of attention from not only the designers of buildings, dams, piers, hydraulic systems, and storage vessels but also from the owners who want low maintenance structures and systems that remain in operating condition for long periods of time. Coatings, liners, paints, and various surface treatments have all been employed with varying degrees of success, and any chipping, cracking, pinholes, or delamination in the coatings or liners usually leads to rapid deterioration of the underlying surface.

Perhaps the most widely used construction material today, other than wood, is concrete and this is in part due to its cost, formability, and its resistance to adverse conditions. Among the adverse conditions which give the most challenge to designers of concrete structures are those conditions encountered in the handling of waste water and sewerage.

While concrete is widely used in waste water collection and treatment facilities, it is subject to significant corrosive attack when exposed, unprotected, to sulfide generation in waste water. Sources of sulfides in waste water include unregulated industrial discharges, degradation of sulfur-containing organic material, and the microbiological reduction of other forms of sulfur. Urban development and the construction of regional collection and treatment centers has increased waste water travel time in collection systems which consequently increases the opportunity for sulfide generation.

Hydrogen sulfide is a major portion of the odor associated with manholes and waste treatment facilities and it is toxic and corrosive. For concrete, the corrosion process begins with the oxidation of hydrogen sulfide to sulfuric acid. The acid subsequently reacts with the limestone based cement binder in the concrete thus weakening the surface structure leading to the deterioration of manholes, lift stations, and other exposed concrete surfaces.

In the past, a number of solutions to the problem of concrete corrosion have been sought. One early attempt employed vitrified clay liners, but these proved unsatisfactory. More recently, many epoxy coatings have been tested but these tend to fail wherever exposure to significant sulfuric acid attack occurs. Perhaps the most satisfactory protective system developed so far has been the application of pre-formed polyvinyl chloride (PVC) liners to concrete surfaces during construction. While this solution may hold promise for some new concrete construction, there are drawbacks such as handling and properly aligning the PVC sections, sealing the seams, the cost of sufficiently rigid and large diameter PVC structures, and the lack of a water-tight bond between the PVC liner and the underlying concrete which provides space for moisture and condensation to collect.

Furthermore, there is yet to be found any clear cut satisfactory method or materials for rehabilitating existing corroded concrete surfaces, particularly manholes. The current practice of coring out a manhole, inserting a PVC liner, and filling the resulting cavity between the liner and cored out wall with concrete grout has not proven to be a satisfactory solution as the grout tends to crack, become filled with moisture, and allow movement of the liner, requiring additional costly repair.

Another problem in rehabilitation efforts is that these projects do not readily allow for down time, so that conventional concrete surface repair using cement cannot easily take place. Thus, one object of the present invention is to devise a coating that bonds to concrete even while wet and provides protection from sulfuric and other acids.

While bonding coatings and liners have been used in the past, one of the problems is applying the coating so there are no cracks or pinholes. It is through these pinholes that acid can penetrate into the underlying concrete surface. Thus, it is another object of the present invention to provide a concrete liner which is resistant to pinhole and crack formation.

In a report entitled "Evaluation of Protective Coatings for Concrete" by John A Redner, et.al. of the County Sanitation District of Los Angeles County, Wittier, Calif. dated February 1995, it is concluded that: "To survive, the coating not only has to be acid proof and able to bond to the concrete substrate, but it also has to be applicator friendly." Therefore, it is still another object of the present invention to provide a composition which can be readily and successfully applied to concrete surfaces under varying conditions and with a high rate of success.

In the above report by Redner, et.al., the known concrete coatings were placed in the following categories: coal tar, coal tar mortar, concrete sealer, epoxy, epoxy mortar, liner, phenolic, polyester, polyester mortar, polyurea, silicone, specialty concrete, urethane, vinyl ester, and vinyl ester mortar. None of these proved satisfactory in all aspects.

It is, thus, yet another object of the present invention to provide for the application of polyester resin blended in a unique manner not previously employed and to achieve a degree of success not previously available with polymeric resins.

It is still another object of the present invention to provide a concrete liner which can be applied to a concrete surface having an acidic or basic surface, i.e. a pH which is either greater or less than 7.

One further object of the present invention is to provide a binder matrix into which aggregate or reinforcing material can be added in order to form molded, extruded, or cast articles which are substitutes for conventional concrete.

The foregoing and other objects are achieved by the present invention which is described below.

SUMMARY OF THE INVENTION

It has, surprisingly, been found that a liner resin comprising a unique blend of a polymeric bonding resin having superior adhesive and elongation properties with an acid resistant polymer and a filler, when cured and applied to a substrate, will achieve the objects mentioned above.

Another discovery is that a polyester bonding resin, heinafter described, adheres surprisingly well to a wet concrete or a masonry surface when the resin is in a temperature range of about 55° F. (13° C.) to about 90° F. (32° C.), and about 0.75% to about 1.5% benzoyl peroxide is employed as the initiator. It was particularly unexpected that this resin would serve as a bonding resin and would, in addition to readily adhering to the concrete as well as the liner coating, actually penetrate into the concrete and reinforce the concrete which forms the wall surface.

It has also been surprisingly discovered that when the aforementioned liner resin blend is filled with a filler such as kaolin clay as hereinafter specified, that the heat of cross-linking, or curing, of the resin will be rapidly transferred to the substrate or concrete wall surface, and, as the resin is applied, no post-application shrinkage and cracking will occur because significant heat dissipation has already occurred.

More particularly, in one aspect, the present invention is a composition useful in forming a coating for substrate surfaces and for forming molded structures wherein the composition comprises, before it is reacted or cross-linked, a blend having a major portion of a thixotropic, isophthalic, unsaturated polyester resin and a minor portion of a non-thixotropic, unsaturated polyester resin; a filler preferably comprising a kaolin clay, mixed with said blend, said filler comprising 30% to 70% by volume of the mixture; a catalyst; and an initiator. Preferably, the catalyst is cobalt and the initiator is methyl ethyl ketone peroxide.

In another aspect, the present invention is a lined concrete structure comprising a concrete wall surface; a coating layer directly bonded to said surface, said coating layer being a non-thixotropic, unsaturated polyester resin; and a liner layer directly bonded to the coating layer, the liner comprising a cured blend of a non-thixotropic, unsaturated polyester resin; a thixotropic, isophthalic unsaturated polyester resin and a kaolin clay.

In a further aspect, the present invention is a method for preserving and protecting a concrete surface comprising the steps of cleaning the concrete surface to remove loose materials and, after cleaning, leaving the surface in a wet condition; applying a coating to said wet surface, the coating comprising non-thixotropic unsaturated polyester resin; and, mixing a blend of non-thixotropic, unsaturated polyester resin with a thixotropic isophthalic unsaturated polyester resin, a catalyst, and a filler; combining an initiator into said blend to initiate curing; and, applying said combined blend directly to said coating thereby providing a lined, protective concrete surface.

In another aspect, the present invention is a molded or extruded article which comprises the liner resin blend mentioned above as a binder matrix to which aggregate or reinforcing material is added prior to curing. Molded and extruded articles of many useful types may be thus formed.

Further, it has also been surprisingly discovered that the system of the bonding resin and liner resin will bond to the steel making it a protective coating for steel piping and storage vessels both above and underground both on the inside and outside of the vessel or pipe. This is particularly helpful for oil and gasoline storage tanks and for many chemicals.

BRIEF DESCRIPTION OF THE DRAWINGS

The novel features that are considered characteristic of the present invention are set forth with particularity in the appended claims. The invention itself, however, both as to its organization and its method of operation together with additional objects and advantages thereof, will be best understood from the following description of specific embodiments when read in connection with the accompanying drawings, in which:

DETAILED DESCRIPTION

Figure 1:
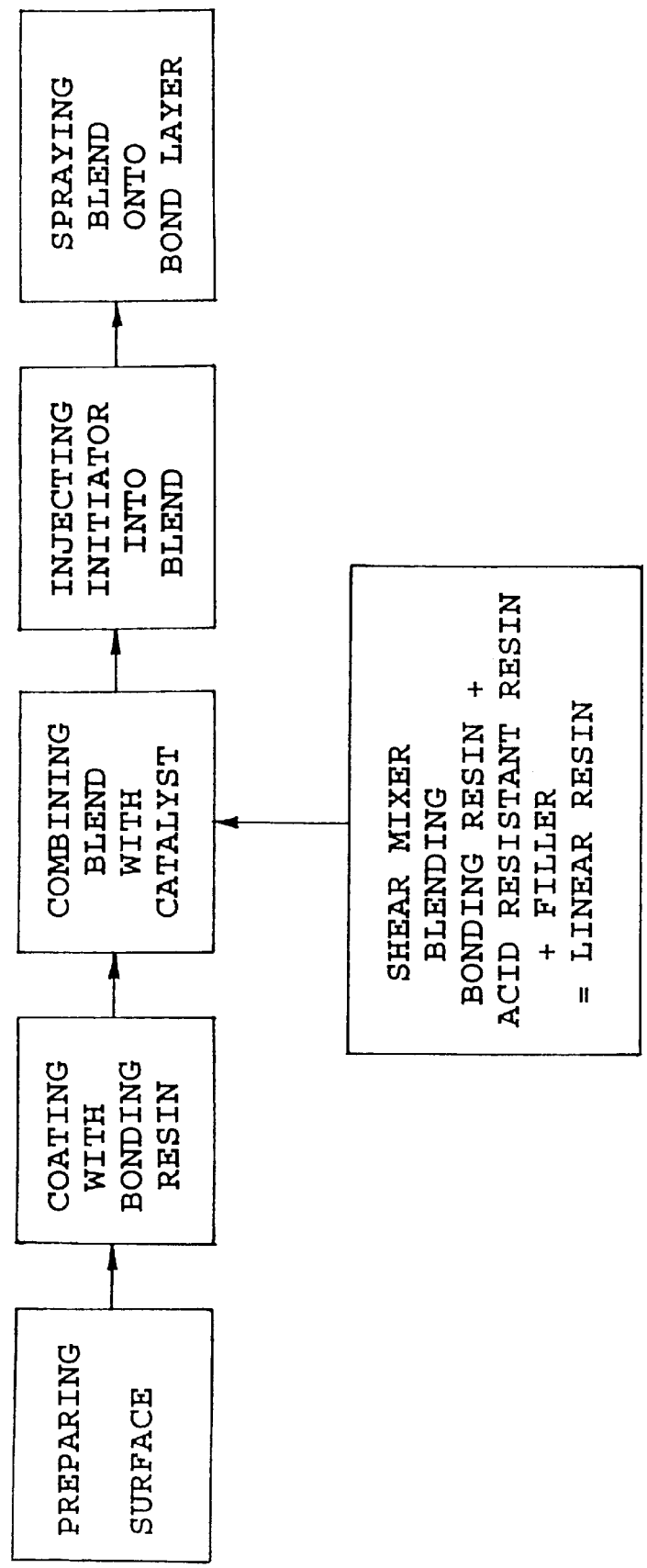
FIG. 1 is a block flow diagram illustrating the sequence of steps that comprise a method of the present invention.

It is an unexpected result of the invention that a coating comprising a unique blend of two polyester resins with a filler can be bonded to either a new or deteriorated concrete wall surface and provide a liner which is acid resistant, free of pinholes, and relatively easy to install in a permanent fashion. In the prior art, other cured, thermosetting polyester compounds are disclosed in U.S. Pat. No. 3,091,936 granted Jun. 4, 1963 to Lundbey, et. al., and the use of fillers is disclosed in U.S. Pat. No. 3,371,712 to Adams on Mar. 5, 1968. U.S. Pat. No. 3,713,297 to Hochback on Jan. 30, 1973 discloses a mixture of unsaturated polyesters with gypsum and moist soil to produce cured structures. None of these, however, disclose the unique advantages and features of invention disclosed herein.

The method of the present invention begins by cleaning the concrete wall surface with a pressure spray and washing it with a baking soda or muriatic acid solution. This is followed by rinsing, and the wall is left wet. The bonding resin is then applied. This resin has been selected because it will readily adhere to a wet concrete surface and will exhibit resiliency and elongation after having been applied. The preferred bonding resin also penetrates and "locks into" the concrete surface. After application, the bonding resin preferably has a tacky surface.

After the bonding resin is applied, the liner is applied. The liner comprises a blend of the bonding resin with an acid resistant resin. This blend is mixed with a filler and then the mixture is combined with a catalyst. This mixture is applied by means of a sprayer and, in the sprayer chamber immediately before the mixture is sprayed, an initiator is added or injected into the mixture so that the resulting liner composition is cured as it is sprayed on to the tacky bonding resin. The sprayer applies the mixture uniformly and, as it cures and hardens, it provides an acid resistant surface which is pinhole free and crack resistant. Furthermore, the ability of the bonding layer to lock into the concrete and undergo a measure of elongation or shear elongate prevents delamination between the liner and the bonding resin as the liner is applied and hardens. The bonding layer secures the liner and since each layer has a polymer in common there is mixing at the interface to provide an even greater resistance to delamination. This also provides resistance to subsequent rupture due to temperature changes and minor earth movements such as settling.

The foregoing method can be used for both new concrete surfaces and to rehabilitate aged, corroded, deteriorated concrete surfaces or for masonry surfaces. In some instances, it may be necessary to patch deep crevasses with mortar in a badly deteriorated surface, but the method of the present invention can then be used to install the liner on such surfaces.

The liner is not only useful for manholes but can also be used for collection or lift stations which are employed in sewerage systems and can be applied to the interior surface of large diameter collection pipes.

It has also been surprisingly discovered that the liner resin mixture mentioned above can be used in the production of concrete substitutes by mixing it with aggregates and sand. The combined mixture can be cast or molded or formed by other techniques into numerous products.

To further appreciate the invention in the detailed description that follows, the following definitions should be applied:

"Bonding" resin as used herein means a polymeric resin capable of adherence to wet concrete surfaces, and when applied to said surfaces will be resilient and will be able to undergo substantial elongation without rupture, up to 20% or more. A particular group of resins which meet these requirements are prepromoted, low viscosity, highly resilient, non-thixotropic, unsaturated polyester resins. A specifically useful and preferred resin of this type is a resin sold by Alpha/Owens Corning of Collierville, Tenn. and designated "ALTEK-52-561 M". The "ALTEK-52-561 M" is available for room temperature curing using either methyl ethyl ketone peroxide or benzoyl peroxide. It is useful for applications requiring toughness and high impact strength, and the manufacturer states that the product may be used for thin polymer concrete overlays on certain bridge structures.

"Acid resistant" resin as used in herein means a resin which is resistant to attack by both weak and strong acids. Generally, these will include the isophthalic resins. A preferred and specifically useful resin is a promoted, thixotropic, isophthalic type, unsaturated polyester resin designated as "E-704 Resins" which are sold by Owens/Corning Fiberglass Corporation. Data from the manufacturer identifies this resin as having long term resistance to acidic attack, particularly to sulphuric acid.

"Filler" as used herein means an inert additive which has the capability of dispersing or transferring heat. Particularly useful are clays, particularly, the aluminum silicates known as kaolin clays. Specifically preferred is a clay designated as "Burgess KE" clay manufactured by Burgess Pigment Company of Sandersville, Ga.

"Catalyst" as used herein has the common meaning of a substance which accelerates a chemical reaction. Specifically preferred are cobalt and cobalt compounds such as cobalt salts.

"Initiator" as used herein means an agent which causes a cross-linking or curing reaction to begin. A specifically preferred initiator is benzoyl peroxide or dibenzoyl peroxide (DBP). Methyl ethyl ketone peroxide (MEKP) is also a useful initiator with polyester resins.

"Sprayer" as used herein means a sprayer capable of pumping and spraying from a reservoir a resin mix which can be cured while spraying. A particularly useful and specifically preferred sprayer is the Venus Gussmer Pro Series internal catalyst mix airless spray system (VGAS). The sprayer nozzle is preferably equipped with an air knife or certain means to guide, shape, and direct the resin mix spray.

"Masonry surface" as used herein includes a brick and mortar surface or a surface of concrete or cinder block and mortar.

Turning now to the drawings, FIG. 1 shows the steps of the process in a flow diagram. After the surface, which may be concrete or other substrates, has been cleaned and prepared by washing with a 50% muriatic acid solution or with baking soda and water solution to remove loose particles, the surface is rinsed with water and then air blown to remove any water accumulation. If any patching of the surface is needed then it is performed at this step.

Next, the bonding coating is applied with a preferred coating being a polyester resin of the type mentioned above. This application can be by painting, sponging, rolling, or spraying. The optimum or preferred method is to spray with a Venus Gussmer sprayer or similar equipment which internally injects the initiator. This surface is allowed to become tacky which takes 5 to 20 minutes depending upon air temperature, substrate temperature and humidity. The thickness of the applied bonding layer should be from about 5 mils to about 30 mils and this will depend upon the surface of the substrate, that is, if the substrate will require a thicker coating to penetrate and cover all of the small cavities that may be present.

Next, the liner resin is prepared by combining in a shear mixer, such as a Banberry Mixer, the bonding resin with the acid resistant resin. Preferably, the acid resistant resin will represent about 75% of the two-resin blend although the percentage of the acid resistant resin can be as high as 90%. The blend of the two resins is then combined with the filler, preferably kaolin clay, which would typically represent 60% of the volume with the blend. A table of the preferred ranges is set forth below:

TABLE 1

| Constituent | Volume Percentage |
| --- | --- |
| Acid Resistant Resin | 66% to 10% |
| Bonding Resin | 4% to 20% |
| Kaolin | 30% to 70% |

The particular mixes and percentages selected will depend upon the particular substrate being coated, but a particularly preferred volume percentage is about 28% acid resistant resin, about 12% bonding resin, and about 60% kaolin clay. After being mixed, the liner resin at this stage is in a paste form which may be stored for further use.

After the liner resin blend is prepared, it is combined with a cobalt compound as a catalyst in an amount up to 2% by volume and then combined with methyl ethyl ketone peroxide in an amount of about 1.5% by volume which initiates the chemical cross linking reaction that causes the liner resin to commence hardening. As used herein, the terms "cross linking" and "curing" will be used interchangeably as the reaction initiated by the peroxide is a cross-linking reaction to cross link the molecular chains of the polymers which, in the preferred case, are polyesters. The addition of cobalt or other catalysts increases the reaction speed and affects the amount of initiator required. The initiator can also be called a cross-linking agent or curing compound. Thus, depending on external conditions such as heat or humidity it may be desirable to either speed up or slow down the reaction rate. The completion of the cross linking process changes the polymer to a thermosetting polymer making it virtually insoluble, and by including an isophthalic resin, the thermosetting polymer blend becomes highly acid resistant making it a very suitable and satisfactory liner for acidic environments.

Figure 2:
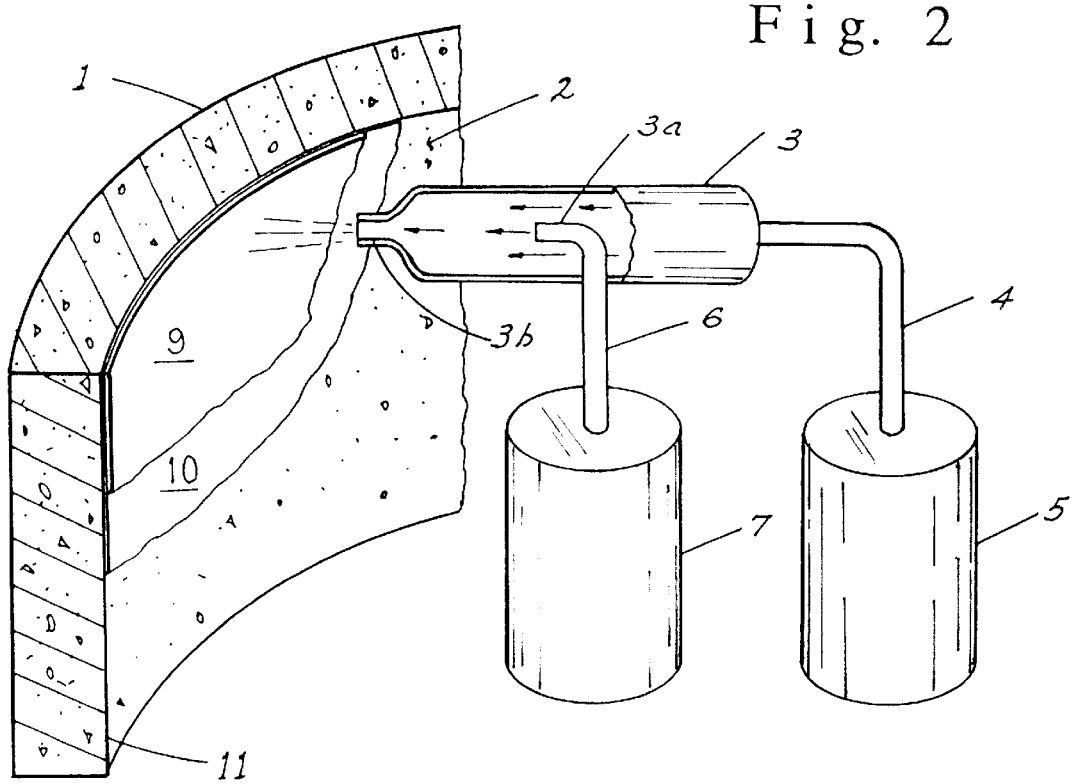
FIG. 2 is a schematic representation of a segment of a manhole wall onto which the liner composition according to the present invention is being applied by spraying.

Still referring to FIG. 1, but also looking at FIG. 2 for the next step in the process, in FIG. 2 a concrete wall section (1) of a manhole having a cleaned and prepared surface (2) to be coated is schematically represented. At this point, the concrete surface (2) has been coated with the bonding resin mentioned above. Sprayer (3) is fed by supply line (4) from reservoir (5) of liner resin prepared according to the above steps. Injected into the sprayer (3) at this point will be the initiator or peroxide through supply line (6) from reservoir (7) to combine with the blend and begin the cross linking process which is an exothermic reaction. The particular selection of an internal catalyst type of sprayer is vital in this regard because a cross linking reaction cannot begin earlier in the process or pumping difficulties and clogging will develop as the cross linking reaction begins, nor can it satisfactorily begin later by injecting it into the resin stream in air immediately after the resin leaves the nozzle as is done in some prior art processes. The point at which to preferably initiate the reaction is near the exit of and within the reaction chamber (3a) prior to exiting as a spray through the nozzle (3b). This process and the unique combination of resin properties allows the heavily filled liner resin mix to be successfully applied by spraying.

While the description of the preferred process provides that the liner resin is applied to the bonding resin which has already been applied to a surface, in certain instances the bonding layer can be dispensed with and the liner resin applied directly to the surface.

Figure 3:
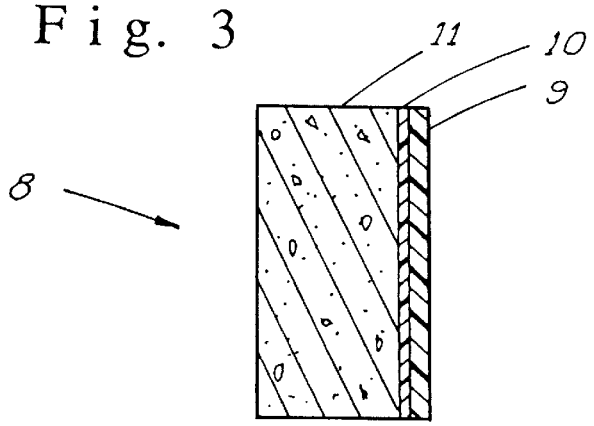
FIG. 3 represents a section of a concrete wall having a surface to which the bonding layer and liner layer have been applied according to the present invention; and, FIG. 4 shows a culvert pipe 12 which is a product made from the composition of the subject invention with aggregate added. Such a product can be made by molding or extrusion.
Figure 4:
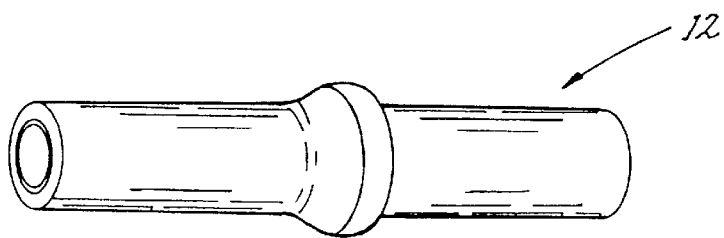

Referring again to both FIGS. 1 and 2, at this stage in the process the resulting product will, in a schematic representation, appear as wall section (8) as shown in FIG. 3, wherein the concrete wall (11) with bonding resin layer (10) adhered thereto and the liner resin (9) is permanently bonded onto the surface of layer (10). Since the liner resin mix includes the resin of the bonding layer (10) and is applied to the tacky surface, an exceptionally delamination-resistant liner system is achieved. The resilience of the bonding layer (10) is an important factor here as with thermal expansion and contraction of the concrete wall. The bonding layer is able to expand and stretch and elongate and yet remain firmly adhered to the wall and at the same time remain bonded to the liner (9).

If it is desired that the liner resin be applied to a surface by means other than spraying, the initiator can be mixed into the liner resin in a drum immediately before it is painted or rolled or sponged onto a substrate, or over the bonding resin layer.

The liner resin, when properly applied, is waterproof, acid resistant, and structurally superior in many respects to the properties of the underlying concrete or other substrate and adheres and bonds to many substrates and types of concretes. It can be cast or poured, or may be used under water. By adding aggregate, sand, and reinforcement, the fabrication of building materials which are traditionally concrete can also be accomplished. The liner resin of the present invention may be used in products which include pipes, manholes, structural members, blocks, wall panels, pilings, culverts, and, in general, substitutes for concrete such as in foundations, walkways, and roads. It is especially useful in marine environments as a substitute for concrete and other structural materials.

In manufacturing such building materials, the liner resin is first combined with aggregates and sand and the cobalt and initiator are added prior to pouring or pumping. The fraction of liner resin by volume may range from 25% to 100%, depending on the desired properties such as strength and durability. The drying time or curing time can be controlled by modifying the amount of initiator and catalyst. An especially strong and useful product results when recycled fiberglass is added to the mix.

The examples below provide further and better understanding of the invention:

EXAMPLE I

A concrete wall surface was coated with the E-704 resin identified hereinabove as an acid resistant polymer. MEKP was used as the initiator. After curing, the hardened resin was readily stripped from the wall surfaces and did not appear to exhibit useful adhesion.

EXAMPLE II

The Altek 52-561 polyester bonding resin was blended with the E-704 resin with MEKP initiator and applied to a concrete wall surface and allowed to cure and harden. Manual removal proved difficult but some shrinkage and a tendency towards brittleness and cracking was observed.

EXAMPLE III

A filler of kaolin clay (aluminum silicate) was added to the blend of the two polyester resins of Example II and applied to a concrete wall surface. Cracking appeared eliminated. It is thought that the heat transfer characteristics of the kaolin cause the heat to be dispersed as the curing reaction occurs, so that slower and more uniform hardening takes place thereby eliminating the tendency to crack.

EXAMPLE IV

The Altek 52-561 resin was applied to a concrete wall surface with MEKP as the initiator and allowed to cure until the surface was tacky. The blend of E-704, Altek 52-561 and kaolin with MEKP initiator was then applied to the tacky surface. The resulting two layer coating could not be removed manually without destroying the coating or removing portions of the surface.

EXAMPLE V

Samples of solid cylinders of concrete were prepared by pouring a concrete mix of cement, sand, aggregate, and water into hollow plastic cylinder of 3" diameters with a 4" long, ¼" diameter bolt positioned in the longitudinal axis position so that a portion of the bolt extended longitudinally outward beyond one concrete circular face. When the concrete had hardened, the plastic cylinders were removed and the circular end surfaces of a pair of cylinders opposite the bolt were coated with Altek 52-561 resin containing an initiator. Each of the so coated cylinders was then inserted into opposite ends of a 3" plastic cylinder with the coated surfaces towards each other. The cylinders were inserted until the coated surfaces were about ¼" apart and were held there. At this point, a hole was drilled into the plastic cylinder and the ¼ space was filled with the liner resin mix or with the bonding/primer coating composition and allowed to harden. Details of the samples and the results are as follows:

| Sample Make-Up |
| --- |
| Samples 1 through 3 were concrete cylinders 3" diameter bonded together with a bonding primer coat and a resin liner material |
| Bonding/Primer Coat = Alpha Owens-Corning Altek 52–561M Methyl Ethyl Ketone Peroxide |
| Resin Liner = 12% Altek 52–561M 28% Alpha Owens-Corning E-704 60% Aluminum Silicate Kaolin 1% by Volume Methyl Ethyl Ketone was added to above mixture |
| Sample No. 4 comprised concrete cylinders of 3" |

-continued

Sample Make-Up diameters bonded together with a bonding/primer coat only.
Bonding/Primer Coat = Alpha Owens-Corning Altek 52–561M
Benzoyl Peroxide (Initiator)
Sample No. 5 comprised concrete cylinders of 3" diameters bonded together with a bonding/primer coat only.
Bonding/Primer Coat = Alpha Owens-Corning Altek 52–561M
Methyl Ethyl Ketone Peroxide (Initiator)

In the test, after the resins had cured and hardened, the opposed bolts of the cylinder pairs which were bonded at their coated surfaces were gripped and were pulled apart according to the procedures of ASTM-D638, "Standard Test Method for Properties of Un-Reinforced/Reinforced Plastics" for determining tensile strength. The results were:

TEST RESULTS

| Sample No. | Load (lbs) | Bond Strength (PSI) |
| --- | --- | --- |
| 1 | 500 | 71 |
| 2 | 1150 | 163 |
| 3 | 945 | 134 |
| 4 | 2300 | 326 |
| 5 | 925 | 131 |

Samples 1 through 3 included the liner resin and the bond failures occurred with loads in the range of 500 lbs to 945 lbs. Samples 4 and 5 did not include the liner resin. Sample 4 shows the significant strength improvement which was discovered when using the benzoyl peroxide as an initiator.

Close inspection of the concrete surfaces coated with bonding/primer resin using benzoyl peroxide initiator revealed that the resin had penetrated the concrete up to 1/16" and more and had become an integral part of the concrete structural matrix. This degree of penetration across the concrete/resin interface provides a continuous, integral bonding resin layer that is locked into and is a part of the concrete surface structure. Although there is some penetration when MEKP is used as the initiator, the penetration is not to the same degree and depth.

EXAMPLE VI

PREFERRED EMBODIMENT

Hollow concrete cylinders were obtained to simulate the typical manhole, which, at its opening, is 24 inches. Usually, a manhole will increase in diameter below the surface going to 36 inches and then 48 inches. In the United States the average manhole depth is about 9 feet. Lifting stations, on the other hand, may run as deep as 30 feet.

The interior surfaces of the cylinders were first coated with the bonding/primer coating of sample 4 of Example V by spraying with a Venus Susmer sprayer. After the surface cured and became tacky the resin liner mix of samples 1 through 3 of Example V was sprayed on the tacky surface of the bonding resin. After curing and hardening by using hammers with chisels and screw drivers the layers of resin could be removed from the concrete surface only by removing the concrete to which the resin was bonded.

EXAMPLE VII

Steel plate sections were coated according to the process of the invention as described in the foregoing Examples by first applying the bonding resin and then the liner resin. As with the concrete sampler above, delamination could not be initiated with hand tools.

Because of the strong bond to steel that can be achieved, the coating and method of the invention provides an excellent protective lining for steel in storage and naval vessels, piping, beams and plate exposed to corrosive environments. The invention has the advantage that the surfaces to be coated can be selected and coated before or after construction is completed.

Although certain specific embodiments and a preferred embodiment of the present invention have been shown and described above, it is to be understood that many modifications thereof are possible and may occur to those skilled in the art after having read the foregoing specification. The invention, therefore, is not to be restricted except insofar as is necessary by the prior art and the spirit and intent of the scope of the following claims.

What is claimed is:

1. A method for preserving, protecting, and/or restoring a concrete or masonry surface comprising the steps of:

a. cleaning the concrete surface to remove loose material and, after cleaning, leaving said surface in a wet condition;

b. applying a coating to said wet surface, said coating comprising a non-thixotropic unsaturated polyester resin, and c. blending a minor portion of non-thixotropic unsaturated polyester resin with a major portion of thixotropic, isophthalic unsaturated polyester resin, and a catalyst to form an acid resistant polymeric blend and combining said blend with 30% to 70% by volume with a head dispersant filler to form a mixture;

d. combining an initiator to initiate curing of the polymers in said mixture; and e. applying said combined mixture directly to said coating thereby providing a crack resistant liner for protecting said concrete surface.

2. A method for applying a liner to new or deteriorated concrete or masonry surfaces to protect same from the effects of acidic corrosion, said method comprising the steps of:

a. providing a coating resin which comprises a prepromoted low viscosity, highly resilient, non-thixotropic, unsaturated polyester; an acid resistant resin of a prepromoted thixotropic, isophthalic, unsaturated polyester; a filler selected from the group consisting of kaolin clay, ground fiberglass, and blends thereof; an initiator selected from the group consisting of methyl ethyl ketone peroxide and benzoyl peroxide, and a catalyst;

b. combining up to about 30% by volume of the coating resin with the balance being said acid resistant resin in a shear mixer to form a blend and then adding 30% to 70% by volume to the blend of said filler to form a liner resin;

c pressure washing the concrete surface to be protected to remove loose surface particles; rinsing; and leaving said surface wet;

d. applying said coating resin to said surface while wet in a thickness from about 5 mils to about 30 mils and allowing the surface to become tacky, e. adding up to 2% by volume of catalyst to the liner resin and subsequently combining therein about 2% to 4% by volume of said initiator thereby causing the resulting mixture to begin curing and hardening, and f. applying said mixture to the tacky coating surface whereby as the mixture completes the hardening process an acid resistant liner is produced.

3. The method of claim 2 including the step of providing a sprayer and in steps (e) and (f) said liner resin and catalyst are fed into the sprayer and subsequently, said initiator is added to the liner resin within the sprayer as said liner resin is applied by spraying.

4. The product produced by the method of claim 2.

5. The method of claim 1 wherein said initiator is benzoyl peroxide.

6. The method of claim 1 wherein said filler is selected from the group consisting of ground fiberglass, kaolin clay, and blends thereof.

7. A method for preserving, protecting, and restoring concrete and masonry surfaces comprising the steps of:

a) blending two unsaturated polyester resins, one of which is an acid resistant, thixotropic isophthalic resin and comprises at least about 70% by volume of the resulting blend, and the other is a non-thixotropic resin and comprises a minor portion blend;

b) mixing said blend with at least about 30% by volume with a heat dispersant filler selected from the group consisting of kaolin clay, ground fiberglass, and blends thereof to form a mixture;

c) combining said mixture with an initiator and applying the resulting mixture to a masonry or concrete surface which has been coated with a composition comprising the non-thixotropic resin of said blend whereby as the resins of said blend cure the heat produced thereby is rapidly dispersed by said filler to said surface thereby reducing the tendency of cured mixture to crack.

* * * * *